Patented May 11, 1954

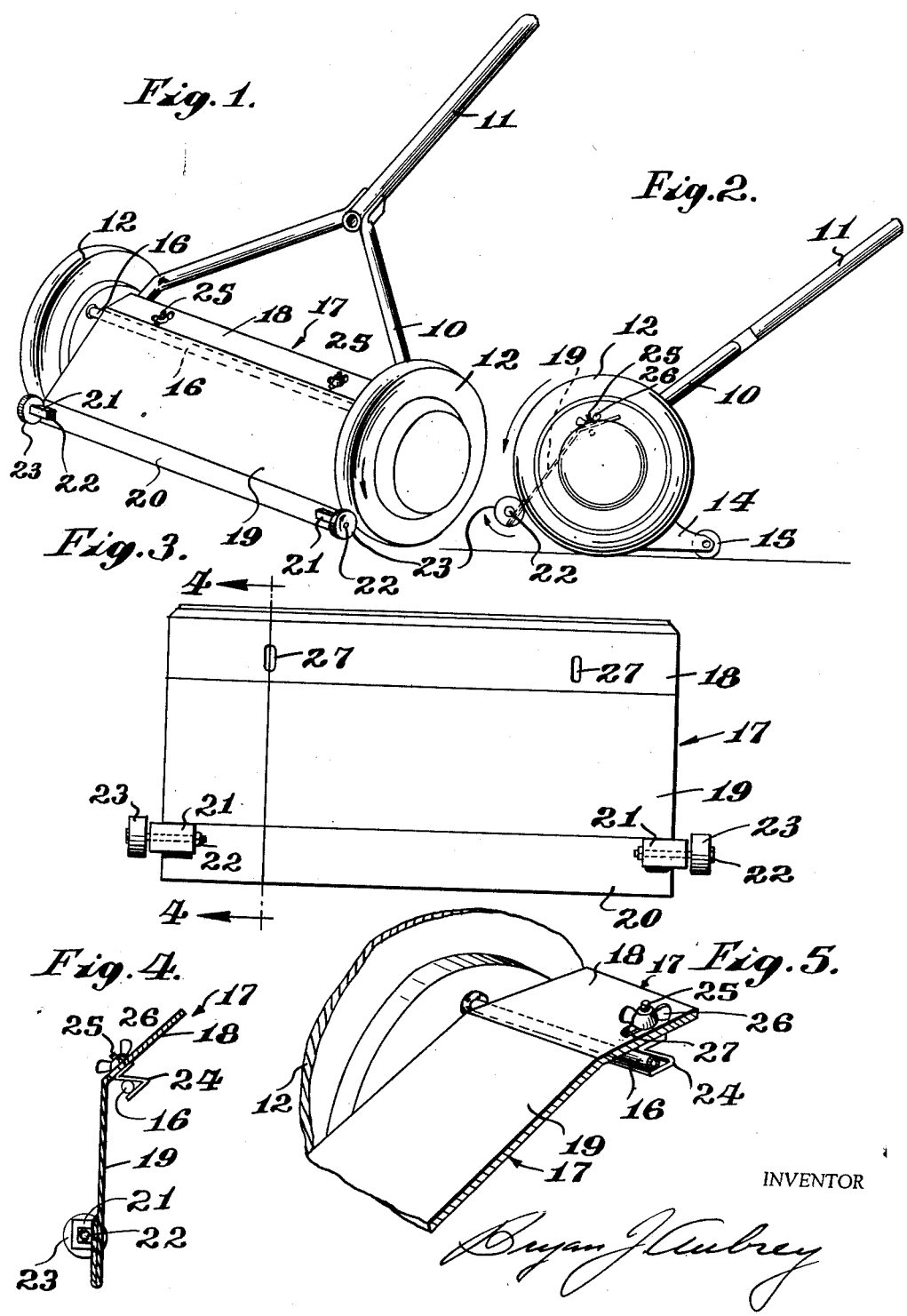

2,677,927

UNITED STATES PATENT OFFICE 2,677,927

SAFETY SHIELD FOR LAWN MOWERS

Bryan J. Aubrey, Salt Lake City, Utah

Application February 16, 1953, Serial No. 337,040

2 Claims. (Cl. 56—249)

This invention relates to a lawn mower, and more particularly to a safety shield for a lawn mower.

The object of the invention is to provide a safety shield for a lawn mower which will prevent damage to plants, shrubs and the like which may accidentally be pulled into or fall into the mower cutting blades.

Another object of the invention is to provide a safety shield which is adapted to be used on a conventional lawn mower, the safety shield of the present invention being readily attached to and detached from the lawn mower, the present invention including a self locking mechanism and wherein there will be effected a saving of time and labor when using the safety shield of the present invention.

A further object of the invention is to provide a safety shield for a lawn mower which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of a lawn mower showing the safety shield of the present invention attached thereto.

Figure 2 is a side elevational view of the lawn mower with the safety shield thereon.

Figure 3 is an enlarged plan view of the safety shield of the present invention.

Figure 4 is a sectional view taken on the line 4—4 of Figure 3.

Figure 5 is an enlarged fragmentary perspective view of the safety shield on the lawn mower, with parts broken away and in section.

Referring in detail to the drawings, the numeral 10 designates a yoke of a conventional lawn mower and connected to the yoke 10 is a handle 11. The lawn mower further includes a pair of spaced parallel ground engaging wheels 12, and arms 14 serve to support the usual ground engaging roller 15, Figure 2. A mower expansion bar 16 is positioned forwardly of the yoke 10.

The present invention is directed to a safety shield which is indicated generally by the numeral 17, and the safety shield 17 is adapted to prevent damage to any plants or shrubs which may be pulled into or fall into the cutting blades of the lawn mower. The safety shield 17 includes a pair of sections 18 and 19 which are arranged angularly with respect to each other, and the lower leading edge 20 extends downwardly from the section 19.

Secured to the shield 17 in any suitable manner, is a pair of body members 21. A bolt and nut assembly 22 serves to connect a roller or wheel 23 to each of the body members 21, and the rollers 23 engage the wheels 12 to serve as a self locking mechanism to maintain the shield 17 in its proper place on the lawn mower.

A means is provided for securely clamping the shield of the present invention on the lawn mower and this means comprises a pair of Z-shaped brackets 24 which are adapted to be arranged in engagement with the bar 16. A suitable bolt or screw 25 is secured to each of the brackets 24, and the bolts 25 extend through slots 27 in the shield 17. A suitable wing nut 26 is adapted to be arranged in threaded engagement with each of the bolts 25 for maintaining the parts clamped together.

From the foregoing, it is apparent that a safety shield has been provided which can be used and adapted for any standard lawn mower. The shield, when attached to a standard lawn mower, will prevent damage to any plants or shrubs which may be pulled into or fall into the cutting blades of the lawn mower. The shield may be made of any suitable material such as metal which is bent at the proper angle and it is provided with means for enabling the shield to be instantly attached and removed. Also, the rollers 23 and wing nuts 26 insure that the shield will not accidentally work loose from the lawn mower. The shield 17 is of the proper shape and size to cover the entire length of the cutting blades. The rollers 23 engage the opposite wheels 12 of the lawn mower to provide that the shield will be self locking. The shield can be made in different widths for various lawn mowers and can be made of sheet metal, wood, or other suitable material. By means of the present invention there will be effected a saving in labor when cutting lawns and also damage from mower blades to plants and shrubs will be prevented. Also, the shield will remain steady when attached to the lawn mower, and will prevent damage from above the cutting blades and therefore shrubs, plants and the like will not be harmed during the trimming or cutting of the grass.

I claim:

1. In a lawn mower, a frame including a yoke, a pair of ground engaging wheels arranged contiguous to said yoke, a handle connected to said yoke, a horizontally disposed bar arranged forwardly of said yoke, a safety shield interposed between said pair of wheels and including a first and second section arranged angularly with respect to each other, a pair of rollers journaled in said shield for engaging said ground engaging wheels, there being a pair of slots in said shield, Z-shaped brackets engaging the undersurface of said shield and engaging said bar, and securing elements extending through said slots and connected to said brackets.

2. For use with a lawn mower including a frame having a yoke, a pair of ground engaging wheels carried by the ends of the yoke, a handle connected to the yoke, a horizontally disposed guard bar arranged forwardly of the yoke and extending between the wheels above the centers thereof and cutters extending between the wheels below the guard bar; a safety shield adapted to overlie the cutters and comprising a one-piece rigid body portion having angularly related first and second sections, said first section being adapted to extend downwardly and forwardly of the bar with the second section being substantially horizontally extended rearwardly of the bar, clamping elements carried by the second section and depending therefrom adjacent the juncture of said sections for engaging the bar, rollers carried by the free end of the first section and laterally extended from the side edges thereof for peripheral engagement with the wheels to hold the body portion in place in conjunction with the clamping elements.

References Cited in the file of this patent

UNITED STATES PATENTS

| Number | Name | Date |
| --- | --- | --- |
| 273,469 | Coldwell | Mar. 6, 1883 |
| 1,459,034 | Quimby | June 19, 1923 |
| 2,091,077 | Limbach | Aug. 24, 1937 |
| 2,308,218 | Underwood | Jan. 12, 1943 |